(12) United States Patent
Maier

(10) Patent No.: US 7,209,866 B2
(45) Date of Patent: Apr. 24, 2007

(54) METHOD AND ARRANGEMENT FOR AUTOMATIC ADJUSTMENT OF DEVICES HAVING SETTING ELEMENTS, AND A CORRESPONDING COMPUTER PROGRAM PRODUCT AND A CORRESPONDING COMPUTER-READABLE STORAGE MEDIUM

(75) Inventor: Thomas Maier, Sasbachwalden (DE)

(73) Assignee: Marconi Communications GmbH, Backnang (DE)

( * ) Notice: Subject to any disclaimer, the term of this patent is extended or adjusted under 35 U.S.C. 154(b) by 40 days.

(21) Appl. No.: 10/506,915

(22) PCT Filed: Mar. 21, 2003

(86) PCT No.: PCT/IB03/01604

§ 371 (c)(1),
(2), (4) Date: Apr. 25, 2005

(87) PCT Pub. No.: WO03/081349

PCT Pub. Date: Oct. 2, 2003

(65) Prior Publication Data

US 2006/0004532 A1  Jan. 5, 2006

(30) Foreign Application Priority Data

Mar. 21, 2002 (DE) ................ 102 12 427

(51) Int. Cl.
*G06F 15/00* (2006.01)
*H04B 15/00* (2006.01)

(52) U.S. Cl. .............. 702/189; 702/191; 333/17.1

(58) Field of Classification Search ............. 702/57, 702/75, 189–191, 193; 333/17.1, 205, 207, 333/209
See application file for complete search history.

(56) References Cited

U.S. PATENT DOCUMENTS

| 5,019,792 | A | * | 5/1991 | DiBiase et al. ............. 333/17.1 |
| 5,117,377 | A | * | 5/1992 | Finman ............................ 703/2 |
| 5,557,530 | A | * | 9/1996 | Guglielmi ........................ 716/1 |
| 6,750,730 | B2 | * | 6/2004 | Heisen et al. ................... 333/1 |

OTHER PUBLICATIONS

Harscher et al., "Automated Computer-Controlled Tuning of Waveguide Filters Using Adaptive Network Models", Nov. 2001, IEEE Transactions on Microwave Theory and Techniques, vol. 49 No. 11, pp. 2125-2130.*

* cited by examiner

*Primary Examiner*—Edward Raymond
*Assistant Examiner*—Mary Catherine Baran
(74) *Attorney, Agent, or Firm*—Kirschstein, et al.

(57) ABSTRACT

Devices having setting elements are adjusted by carrying out a first measurement of a characteristic curve to be controlled at predefined measurement points, each setting element assuming a reference setting; testing a termination condition and terminating the method if this condition is satisfied; and, if the termination condition is not satisfied, modifying the reference setting of each setting element and measuring the characteristic curve again at predefined measurement points for this configuration; reproducing the initial reference setting of the modified setting element; when there is more than one setting element, calculating the gradient functions of the characteristic curve; calculating new settings by minimizing an error function by using the obtained measured values and the calculated gradient functions; and carrying out the method again, beginning with the new calculated settings serving as the new reference setting.

20 Claims, No Drawings

METHOD AND ARRANGEMENT FOR AUTOMATIC ADJUSTMENT OF DEVICES HAVING SETTING ELEMENTS, AND A CORRESPONDING COMPUTER PROGRAM PRODUCT AND A CORRESPONDING COMPUTER-READABLE STORAGE MEDIUM

BACKGROUND OF THE INVENTION

The invention relates to a method and an arrangement for automatic adjustment of devices having setting elements, and a corresponding computer program product and a corresponding computer-readable storage medium, which can be used in particular for computer-aided adjustment of microwave filters.

Microwave filters are still in many cases adjusted manually in a conventional way. The mutual influencing of the resonators and couplings makes both manual and automated computer-aided adjustment difficult. For the manual adjustment of these filters, experienced personnel are required and the adjustment time is therefore associated with high costs. Automated methods, which carry out this complex adjustment satisfactorily, have hitherto not been used.

SUMMARY OF THE INVENTION

The invention is therefore based on the object of developing a method and an arrangement, and a corresponding computer program result and a corresponding computer-readable storage medium which overcome the aforementioned disadvantages. In particular, a method is to be made available which can easily be adapted to various devices to be adjusted and permits effective and cost-effective adjustment.

A particular advantage of the method for automatic adjustment of devices having setting elements consists in the fact that the adjustment comprises the following steps:
a) Carrying out a first measurement of a characteristic curve to be controlled by the adjustment at predefined measurement points, the or each setting element assuming a first setting, the "reference setting",
b) testing a termination condition and terminating the method if this condition is satisfied, executing the following steps if the termination condition is not satisfied,
c) modifying the reference setting of a setting element and measuring the characteristic curve again at predefined measurement points for this setting element configuration,
d) reproducing the initial reference setting of the setting element modified in step c),
e) when there is more than one setting element, repeating the steps c) and d) for each setting element,
f) calculating the gradient functions of the characteristic curve,
g) calculating new settings of the setting elements by minimizing an error function by using the measured values obtained in steps a) and c) and the gradient functions calculated in step f),
setting the elements to the calculated values,
h) carrying out the method again, beginning with step a), the settings calculated in step g) serving as the new "reference setting".

An arrangement for automatic adjustment of devices having setting elements is distinguished by the fact that it has a processor which is set up in such a way that an adjustment method can be carried out according to the method steps set forth above.

A computer program product for automatic adjustment of devices having setting elements is distinguished by the fact that it comprises a computer-readable storage medium, on which a program is stored which, after it has been loaded into the memory of a computer, makes it possible for the computer to carry out a method for automatic adjustment of devices having setting elements, the adjustment comprising the method steps set forth above.

A computer-readable storage medium for automatic adjustment of devices having setting elements advantageously has stored on it a program which, after it has been loaded into the memory of a computer, makes it possible for the computer to carry out a method for automatic adjustment of devices having adjusting elements, the adjustment comprising the method steps set forth above.

A further advantage of the invention lies in the fact that the starting reference setting of the setting elements at the beginning of the method is assumed in the middle of the respective setting range of a setting element or is predefined by means of values from experience or is determined by a preliminary adjustment method.

It proves to be likewise advantageous if, after each measurement of the characteristic curve, a test of the termination condition is carried out and the method is terminated if this condition is satisfied. A preferred embodiment of the inventive method consists in the test of the termination condition comprising an automatic comparison between the measured values of the characteristic curve and predefinable desired values or desired ranges.

Furthermore, it proves to be advantageous for the measurement of the characteristic curve to be carried out as a scalar or vectorial measurement.

A further advantage of the method according to the invention is that, in order to minimize the error function, a gradient method and/or a random method is used.

In a preferred embodiment of the invention, provision is made for the minimization of the error function to be terminated if, at one of the measurement points, the difference between the last determined theoretical value of the characteristic curve and the measured value of the characteristic curve assumes or exceeds a first predefinable magnitude (deltaS11max) for the corresponding setting of the setting elements or if at one of the measurement points the difference between the last determined theoretical setting and the corresponding setting of the setting elements assumes or exceeds a second predefinable magnitude (deltaEEmax) or if in a set of predefinable measurement points the last determined theoretical values of the characteristic curve have reached a predefinable desired value or desired range or if in a set of predefinable measurement points the difference between theoretical values, determined in successive steps of the minimization method, of the predefinable measurement points assumes or falls below a third predefinable magnitude. The last termination condition prevents the minimization of the error function "dying", since, for example, it has migrated to an unexpected minimum and is still moving only in small steps in a limited range.

In this case, it proves to be advantageous for the predefinable magnitudes and/or the predefinable measurement points for each device to be adjusted to be determined individually by means of test measurements.

Furthermore, it is advantageous for the theoretical values of the characteristic curve to be determined by calculating a linear approximation function of the characteristic curve.

Furthermore, it proves to be advantageous if the gradient of a characteristic curve f is determined in accordance with the following rule:

$$f\text{Gradient}(a, i) = df(a, i)/dEE(i)$$
$$= (f(a, i, 1) - f(a, i, 0))/(EE(i, 1) - EE(i, 0)),$$

where:
i=number of the setting element,
a=parameter,
EE=setting element,
EE(i,0)=position of the setting element No. i before the modification of the reference setting,
EE(i,1)=position of the setting element No. i after the modification of the reference setting,
f(a,i,0)=f before the modification of the reference setting of the setting element No. i,
f(a,i,1)=f after the modification of the reference setting of the setting element No. i.

A preferred embodiment of the method according to the invention consists in that for a characteristic curve which, in addition to the setting of the setting elements, depends on further variable parameters, for each configuration of the setting elements, a measurement of the characteristic curve for a plurality of measurement points is carried out, each parameter assuming a plurality of different values. It likewise proves to be advantageous for the number of measurement points to correspond to the number of setting elements.

A further advantage of the method according to the invention consists in the device to be adjusted by adjustment being designed as a microwave filter.

A procedure is advantageous in which, for each configuration of the adjusting elements of a microwave filter, a measurement of the characteristic curve is carried out for a plurality of measurement points, the frequency, as parameter, assuming a plurality of different values.

Furthermore, it constitutes an advantage that the measurement points are distributed uniformly only over the filter forward pass range.

In a preferred refinement of the method according to the invention, provision is made for the characteristic curve to be controlled to describe the reflection factor S11 and/or the S12 parameter and/or the S21 parameter and/or the S22 parameter of a microwave filter.

In this case, it proves to be advantageous for the calculation of new settings of the setting elements to be carried out by the theoretical behaviour of each individual measurement point in the event of a simultaneous change in all the setting elements being simulated by means of linear superposition.

For devices which have a number of n setting elements, the method according to the invention permits the calculation of the characteristic curve to be optimized as early as after n+1 measurements—one reference measurement and n measurements with a modified setting of one setting element in each case—in a limited range without further measurements. The limited range is determined by the quality of the linear approximation to the (nonlinear) characteristic curve on which the method is based. This calculation can therefore be utilized (in this limited range) for the optimization of the settings of the setting elements (after these (n+1) measurements).

The adjustment method can be used advantageously in all types of filter, including the filters with adjustable couplings.

In this case, this method is not restricted to filters, but can be applied generally.

DETAILED DESCRIPTION OF THE PREFERRED EMBODIMENT

The exemplary embodiment of the invention is to be presented below using the adjustment of a microwave filter, the curve of the reflection factor on a filter port (S11) being specifically optimized.

The adjustment method described in the following text makes it possible to adjust these filters automatically with relatively few iteration steps and, as a result, in particular in a short time.

The method proceeds in the following steps:

1. Starting phase:

Depending on the filter type, either the middle of the respective setting range or else values from experience from filters of the same type that have already been adjusted can be predefined as starting settings which, in the exemplary application of the method, represent a starting position at the beginning of the method for the setting elements, designated adjusting elements here. If such values are not available, first of all one of the preliminary adjustment methods known per se must be carried out, in order to determine the starting positions.

2. Iteration—measurement of the reflection factor S11 for the reference position of the compensating elements:

After the compensating elements have assumed this starting position at the beginning of the adjustment method, a first measurement is carried out.

For the iteration steps which may follow, the positions of the compensating elements calculated in the further course of the iteration step serve as a reference position. For this purpose, the compensating elements are reset in each iteration step, an error function being minimized (see below).

The iteration steps are repeated until all the measured values have reached a predefined desired range.

Since the reflection factor S11 depends not only on the position of the compensating elements but also on the frequency as well, it proves to be advantageous to measure the reflection factor S11 for a plurality of different frequency points.

3. Measuring the reflection factor S11 for individual points:

At the start of each iteration step, as mentioned, the compensating elements are in the reference position, as it is known. In each iteration step, the reflection factor S11 is subsequently measured for various combinations of the compensating elements. To be specific, the measurements are carried out in such a way that in each case a compensating element is moved out of its reference position, assumed at the beginning of the respective iteration step, by means of a trial rotation, but the other compensating elements remain in the reference position. The reflection factor S11 is measured for this combination. (For each frequency point, the result is thus, in addition to the first measurement of the reflection factor S11, n further measurements for the reference position of the compensating elements).

4. Calculating the gradient of S11:

From these points, obtained by means of the measurements, the vectorial gradients are then determined (at the various frequency points) in accordance with the following definition (already generally formulated above):

$$S11\text{Gradient}(v, i) = dS11(v, i)/dEE(i)$$
$$= (S11(v, i, 1) - S11(v, i, 0))/(EE(i, 1) - EE(i, 0))$$

here specifically with
v=frequency,
S11(v,i,0)=S11 (complex) before the trial rotation of the setting element No. i,
S11 (v,i,1)=S11 (complex) after the trial rotation of the setting element No. i.

The remaining designations correspond to those explained above.

In order to keep the measurement time per iteration step small, here a low number of frequency points is expedient, for example in the range 1 ... 2)×number of setting elements, and these points must be distributed uniformly only over the filter forward pass range.

5. Calculating the new positions of the adjusting elements by minimizing an error function:

Using the current S11 measured values and the S11 gradients obtained from the preceding measurements, the theoretical behaviour of each individual measurement point in the event of a simultaneous change in all the setting elements is then simulated by means of linear superposition. Therefore, the theoretical positions of the compensating elements, at which a new calculation of the error function is to be carried out, (likewise step by step) is calculated in an approximation method. For this purpose, for example, a gradient method for minimizing the error function, a random method or a combination of the two can be applied. If the new error function value is smaller than the preceding one, the new positions of the compensating elements are used as a basis for the next calculation of the error function. Each measurement point which still does not lie in the desired range makes a contribution to the error function. This contribution is greater the further removed a point is from the desired range.

The minimization of the error function is stopped if, at at least one of the measurement points, the calculated S11 value has changed by more than a predefinable magnitude (DeltaS11max) with respect to the reference value (that is the S11 value associated with the reference position), or when all the measurement points have "migrated into" the desired range. DeltaS11max must hot be chosen to be too large, in order that the linear approximation of the actual nonlinear function of the reflection factor is still sufficiently accurate. If DeltaS11max is chosen to be too small, many iterations are needed and the adjustment lasts too long. An excessively large DeltaS11max value is best detected by the fact that the S11 values predicted theoretically on the basis of the linear approximation and the S11 values measured by the new reference position of the adjusting elements after the iteration no longer agree. The optimum value for DeltaS11max will have to be determined individually for each filter type by means of test measurements.

When the minimization method for the error function has been terminated, the reference positions are available for the following iteration step.

Under certain circumstances, the calculation can supply a new position for individual setting elements which is very far removed from the preceding, corresponding reference position and would probably make the adjustment worse. It is therefore expedient also to limit the difference between newly calculated position and reference position to a maximum value (DeltaEEmax) and likewise to terminate the minimization method when this value is exceeded.

If, following the termination, there are still measured values which do not lie in the desired range, the adjustment method is continued with a further iteration step. The setting elements are then set to the newly calculated positions, which then serve as reference positions for the following iteration step.

The sequence of an iteration step such as has been implemented for example in the case of a 7-loop filter with fixed couplings at $v_0$=26 GHz, can be described in detail in the following way:

(i) measuring the reflection factor S11 with all compensating elements in reference position;
(ii) testing a termination condition and terminating the method if this condition is satisfied, executing the following step if the termination condition is not satisfied;
(iii) trial rotation of the first compensating element;
(iv) measuring S11 ($v_0$,1,1);
(v) reproducing the reference position for the first compensating element and trial rotation of the second compensating element;
(vi) measuring S11 ($v_0$,2,1);
(vii) repeating lines (v) and (vi) until a trial rotation with associated measurement has been carried out for all compensating elements;
(viii) calculating the S11 gradients from the points obtained by means of the measurements;
(ix) calculating new positions for all the compensating elements by minimizing an error function;
(x) terminating the position calculation if DeltaS11max is exceeded at at least one frequency point;
(xi) limiting the difference between newly calculated position and reference position for each compensating element by terminating the position calculation if DeltaEEmax is exceeded in the case of at least one compensating element;
(xii) terminating the position calculation as soon as all the measured points are in the desired range;
(xiii) setting the compensating elements to the newly calculated positions;
(xiv) next iteration step: begin with (i): reference positions are then the positions newly set in step (xiii).

Point (i) and (ii) of the description above of the sequence of the iteration step correspond to steps a) and b), respectively, of the inventive method.

Points (iii) to (vi) correspond to steps c) and d) point (vii) corresponds to step e); point (viii) corresponds to step f); points (ix) to (xii) give a specific exemplary embodiment of step g) of the inventive method.

Apart from the "reflection factor" parameter (S11) treated in the above exemplary embodiment, additionally or alternatively the further S parameters (S21=transfer curve, S12, S22) or other variables to be optimized can also be taken into account in the error function.

In the case of vectorial variables, which are composed of magnitude and phase, such as the reflection coefficient, it is advantageous to measure these components separately and to use them when determining the gradient. In the case of a scalar measurement, in which the individual components are combined into one value, information is lost, since it is no longer possible to detect which component has contributed which magnitude to the measured value. Nevertheless, the gradient of the error function can alternatively also be used for the adjustment in the case of scalar measurement. Then, however, more iterations are required as compared with the vectorial method, for the reasons mentioned, and the probability that a solution will be found is lower.

Alternatively, the gradients determined during an iteration step can furthermore be used for a plurality of following iteration steps, provided the error function becomes smaller. As a result, the adjustment can be made still faster by reducing the number of settings and measurements.

The invention is not restricted to the exemplary embodiments presented here. Instead, by means of combination and modification of the aforementioned means and features, it is possible to implement further design variants without departing from the scope of the invention.

The invention claimed is:

1. A method of automatic adjustment of devices having setting elements, comprising the steps of:
   a) carrying out a first measurement of a characteristic curve to be controlled by the adjustment at predefined measurement points, at least one setting element assuming a first reference setting;
   b) testing a termination condition, and terminating the method if the termination condition is satisfied; and
   c) executing the following steps if the termination condition is not satisfied:
      i) modifying the first reference setting of the at least one setting element, and measuring the characteristic curve again at predefined measurement points for a configuration of the at least one setting element,
      ii) reproducing the first reference setting of the at least one setting element modified in step i),
      iii) when there is more than one setting element, repeating the steps i) and ii) for each setting element,
      iv) calculating gradient functions of the characteristic curve,
      v) calculating new settings of the setting elements by minimizing an error function by using measured values obtained in steps a) and i) and the gradient functions calculated in step iv), and setting the setting elements to calculated values to adjust the devices, and
      vi) carrying out the method again, beginning with step a) with the new settings calculated in step v) serving as a new reference setting.

2. The method according to claim 1, in that the first reference setting of the at least one setting element is assumed to be in a middle of a setting range of the at least one setting element, or is predefined by means of values from experience, or is determined by a preliminary adjustment method.

3. The method according to claim 1, in that after each measurement of the characteristic curve, a test of the termination condition is carried out, and the method is terminated if the termination condition is satisfied.

4. The method according to claim 1, in that the test of the termination condition comprises an automatic comparison between the measured values of the characteristic curve and predefinable desired values or desired ranges.

5. The method according to claim 1, in that the measurement of the characteristic curve is carried out as a scalar or vectorial measurement.

6. The method according to claim 1, in that, in order to minimize the error function in step v), a gradient method and/or a random method is used.

7. The method according to claim 1, in that the minimization of the error function in step v) is terminated if, at one of the measurement points, a difference between a last determined theoretical value of the characteristic curve and the measured value of the characteristic curve assumes or exceeds a first predefinable magnitude (deltaS11 max) for a corresponding setting of the at least one setting element, or if, at one of the measurement points, a difference between a last determined theoretical setting and the corresponding setting of the at least one setting element assumes or exceeds a second predefinable magnitude (deltaEEmax), or if, in a set of predefinable measurement points, the last determined theoretical values of the characteristic curve have reached a predefinable desired value or desired range, or if, in a set of predefinable measurement points, the difference between theoretical values, determined in successive steps of the minimization method, of the predefinable measurement points assumes or falls below a third predefinable magnitude.

8. The method according to claim 7, in that the predefinable magnitudes and/or the predefinable measurement points for each device to be adjusted are determined individually by means of test measurements.

9. The method according to claim 8, in that the theoretical values of the characteristic curve are determined by calculating a linear approximation function of the characteristic curve.

10. The method according to claim 9, in that the gradient function of a characteristic curve (f) is determined in accordance with the following rules:

$$f\mathrm{Gradient}(a, i) = df(a, i)/dEE(i)$$
$$= (f(a, i, 1) - f(a, i, 0))/(EE(i, 1) - EE(i, 0)),$$

where:
   i=number of the setting element,
   a=parameter,
   EE=setting element,
   EE(i, 0)=position of the setting element No. i before the modification of the reference setting,
   EE(i, 1)=position of the setting element No. i after the modification of the reference setting,
   f(a,i,0)=f before the modification of the reference setting of the setting element No. i, and
   f(a,i,1)=f after the modification of the reference setting of the setting element No. i.

11. The method according to claim 1, in that for a characteristic curve which, in addition to the setting of the setting elements, depends on further variable parameters, for each configuration of the setting elements, a measurement of the characteristic curve for a plurality of measurement points is carried out, each parameter assuming a plurality of different values.

12. The method according to claim 11, in that a number of the measurement points corresponds to a number of the setting elements.

13. The method according to claim 1, in that the device to be adjusted by means of adjustment is designed as a microwave filter.

14. The method according to claim 13, in that for each configuration of the adjusting elements of the microwave filter, a measurement of the characteristic curve is carried out for a plurality of measurement points, and in that a frequency parameter assumes a plurality of different values.

15. The method according to claim 14, in that the measurement points are distributed uniformly only over a forward pass range of the microwave filter.

16. The method according to claim 15, in that the characteristic curve to be controlled describes a reflection factor (S11) and/or an S12 parameter and/or an S21 parameter and/or an S22 parameter of the microwave filter.

17. The method according to claim 1, in that the calculation of new settings of the setting elements in step v) is carried out by a theoretical behavior of each individual measurement point in the event of a simultaneous change in all the setting elements being simulated by means of linear superposition.

18. An arrangement having a processor set up for automatic adjustment of devices having setting elements, comprising:
 a) means for carrying out a first measurement of a characteristic curve to be controlled by the adjustment at predefined measurement points, the setting elements assuming a first reference setting;
 b) means for testing a termination condition, and for terminating adjustment if the termination condition is satisfied, and for executing the adjustment if the termination condition is not satisfied;
 c) means for modifying the first reference setting of the setting elements, and for measuring the characteristic curve again at predefined measurement points for a configuration of the setting elements;
 d) means for reproducing the first reference setting of the setting elements modified by the modifying means;
 e) in the presence of a plurality of the setting elements, means for repeating operation of the modifying means and the reproducing means for each setting element;
 f) means for calculating gradient functions of the characteristic curve;
 g) means for calculating new settings of the setting elements by minimizing an error function by using measured values obtained by the carrying means and the modifying means and the gradient functions calculated by the calculating means, and means for setting the setting elements to the calculated values; and
 h) means for carrying out the adjustment again, with the new settings calculated by the calculating means.

19. A computer program product comprising a computer-readable storage medium on which a program is stored which, after the program has been loaded into a memory of a computer, makes it possible for the computer to carry out a method for automatic adjustment of devices having setting elements, the adjustment comprising the steps of:
 a) carrying out a first measurement of a characteristic curve to be controlled by the adjustment at predefined measurement points, the setting elements assuming a first reference setting;
 b) testing a termination condition, and terminating the adjustment if the termination condition is satisfied; and
 c) executing the following steps if the termination condition is not satisfied:
  i) modifying the first reference setting of the setting elements, and measuring the characteristic curve again at predefined measurement points for a configuration of the setting elements,
  ii) reproducing the first reference setting of the setting elements modified in step i),
  iii) in the presence of a plurality of the setting elements, repeating the steps i) and ii) for each setting element,
  iv) calculating gradient functions of the characteristic curve,
  v) calculating new settings of the setting elements by minimizing an error function by using measured values obtained in steps a) and i) and the gradient functions calculated in step iv), and setting the setting elements to the calculated values, and
  vi) carrying out the adjustment again, beginning with step a) with the new settings calculated in step v) serving as a new reference setting.

20. A computer-readable storage medium, on which a program is stored which, after the program has been loaded into a memory of a computer, makes it possible for the computer to carry out a method for automatic adjustment of devices having setting elements, the adjustment comprising the following steps:
 a) carrying out a first measurement of a characteristic curve to be controlled by the adjustment at predefined measurement points, the setting elements assuming a first reference setting;
 b) testing a termination condition, and terminating the adjustment if this condition is satisfied; and
 c) executing the following steps if the termination condition is not satisfied:
  i) modifying the first reference setting of the setting elements, and measuring the characteristic curve again at predefined measurement points for a configuration of the setting elements,
  ii) reproducing the first reference setting of the setting elements modified in step i),
  iii) in the presence of a plurality of the setting elements, repeating the steps i) and ii) for each setting element,
  iv) calculating gradient functions of the characteristic curve,
  v) calculating new settings of the setting elements by minimizing an error function by using the measured values obtained in steps a) and i) and the gradient functions calculated in step iv), and setting the setting elements to the calculated values, and
  vi) carrying out the adjustment again, beginning with step a) with the new settings calculated in step v) serving as a new reference setting.

\* \* \* \* \*